United States Patent
Gwag

(10) Patent No.: US 8,328,151 B2
(45) Date of Patent: Dec. 11, 2012

(54) ARM STAND FOR DISPLAY UNIT

(75) Inventor: Su-Man Gwag, Seoul (KR)

(73) Assignee: Su Man Gwag, Seoul (KR)

( * ) Notice: Subject to any disclaimer, the term of this patent is extended or adjusted under 35 U.S.C. 154(b) by 341 days.

(21) Appl. No.: 12/803,846

(22) Filed: Jul. 7, 2010

(65) Prior Publication Data

US 2011/0006175 A1 Jan. 13, 2011

Related U.S. Application Data

(63) Continuation-in-part of application No. PCT/KR2008/004717, filed on Jan. 7, 2008.

(30) Foreign Application Priority Data

Jan. 7, 2008 (KR) .................. 10-2008-0001930
Jul. 31, 2008 (KR) .................. 10-2008-0075045

(51) Int. Cl.
    *E04G 3/00* (2006.01)
(52) U.S. Cl. ..................... 248/284.1; 248/922
(58) Field of Classification Search .......... 248/274, 248/284.1, 278.1, 280.11, 291.1, 292.11, 248/292.13, 919, 920, 921, 922, 923; 361/679.06
    See application file for complete search history.

(56) References Cited

U.S. PATENT DOCUMENTS

| 6,695,274 | B1 * | 2/2004 | Chiu ............................. 248/371 |
| 7,207,537 | B2 * | 4/2007 | Hung ......................... 248/284.1 |
| 7,726,616 | B2 * | 6/2010 | Zhang et al. ............... 248/284.1 |
| 2002/0066843 | A1 * | 6/2002 | Oddsen et al. ............. 248/282.1 |
| 2004/0245419 | A1 * | 12/2004 | Sweere et al. ............ 248/276.1 |
| 2012/0132771 | A1 * | 5/2012 | Wang ........................ 248/278.1 |

* cited by examiner

*Primary Examiner* — Ramon Ramirez
(74) *Attorney, Agent, or Firm* — David Lewis

(57) ABSTRACT

The present invention provides an arm stand for a display unit which includes a mounting bracket (110), a horizontal bracket (150) and a rotary link unit (120). The rotary link unit includes a main rotary link (130) which is rotatably provided between a base rotating axis (a) of the mounting bracket and a central rotating axis (b) of the horizontal bracket, and an auxiliary rotary link (190) which is rotatably provided between a first upper support axis (c) formed in the mounting bracket above the base rotating axis and a second upper support axis (d) formed in the horizontal bracket above the central rotating axis. The rotary link unit further includes a tension spring (170) which is rotatably provided between the first upper support axis and a lower support axis (e) formed in the horizontal bracket below the central rotating axis.

12 Claims, 11 Drawing Sheets

[Fig. 1]
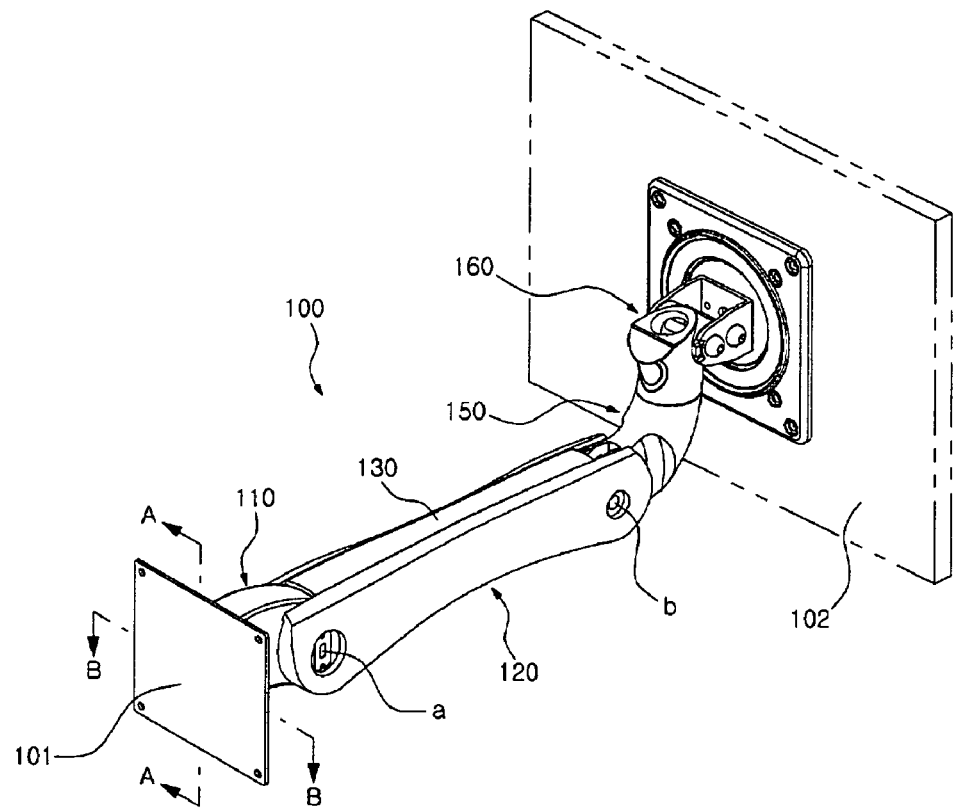
[Fig. 2]
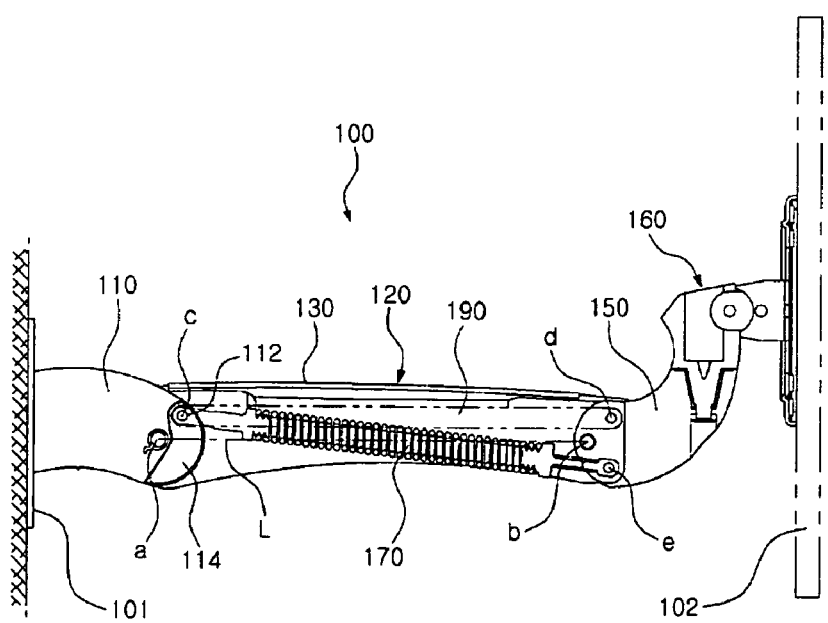

[Fig. 3]
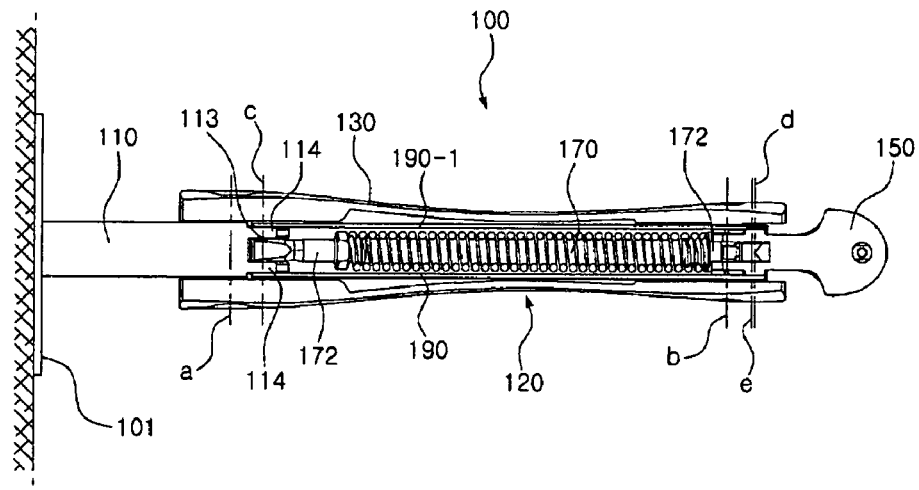
[Fig. 4]
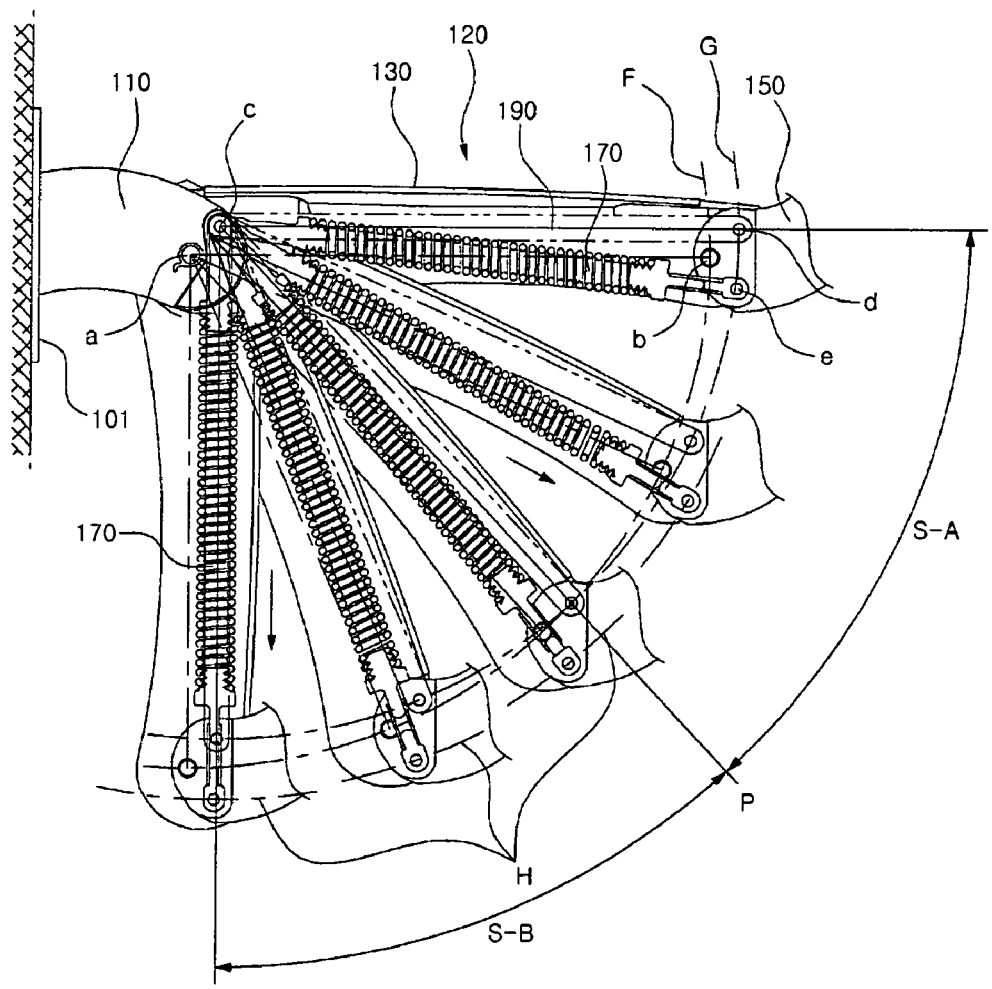

[Fig. 5]
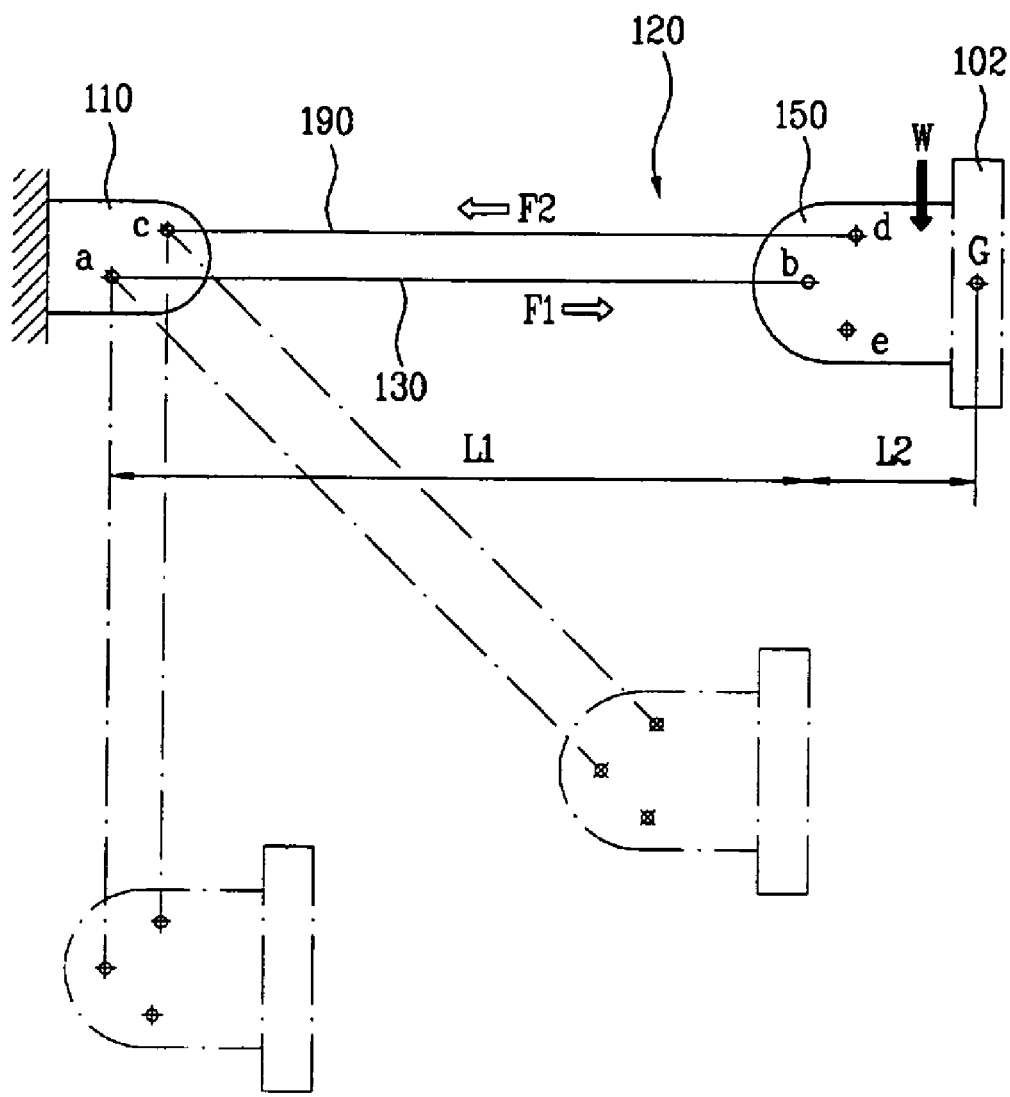

[Fig. 6]
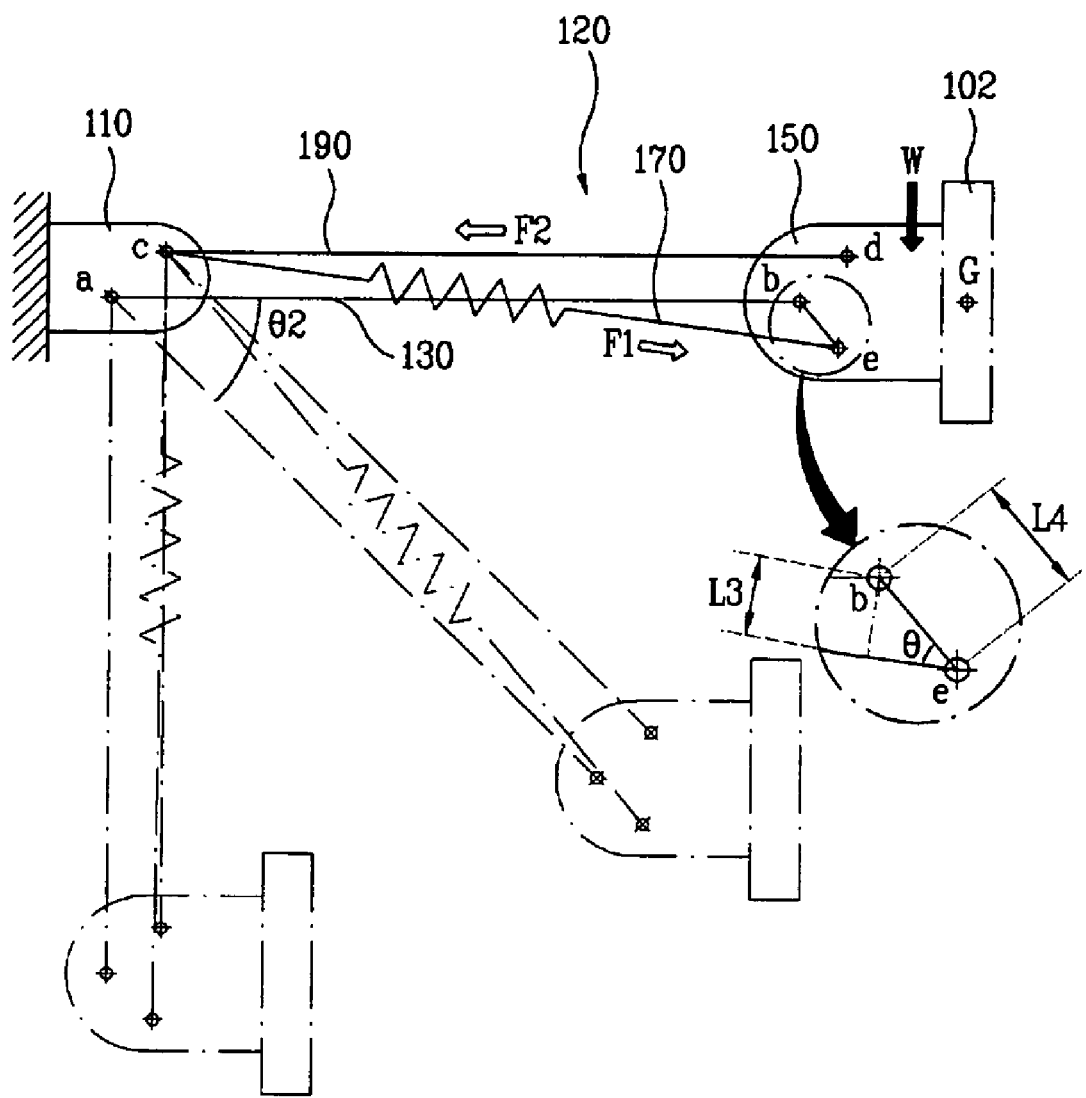

[Fig. 7]
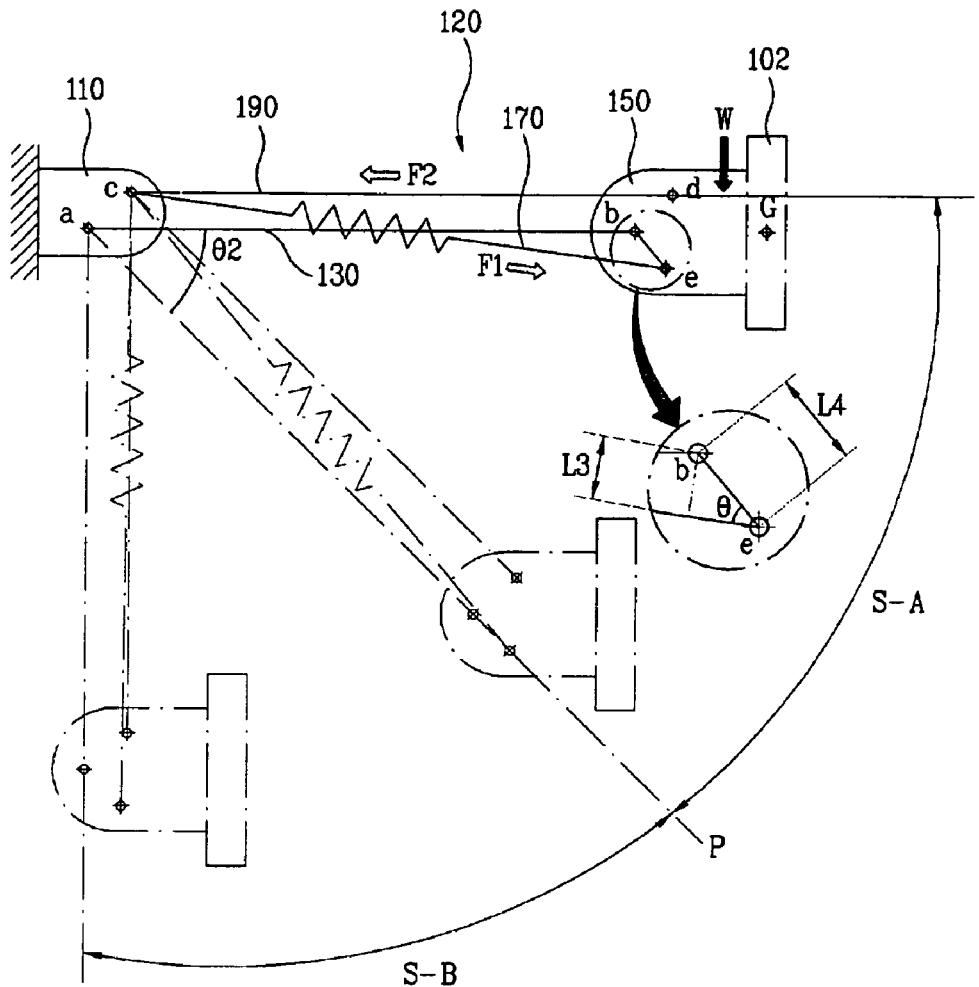
[Fig. 8]
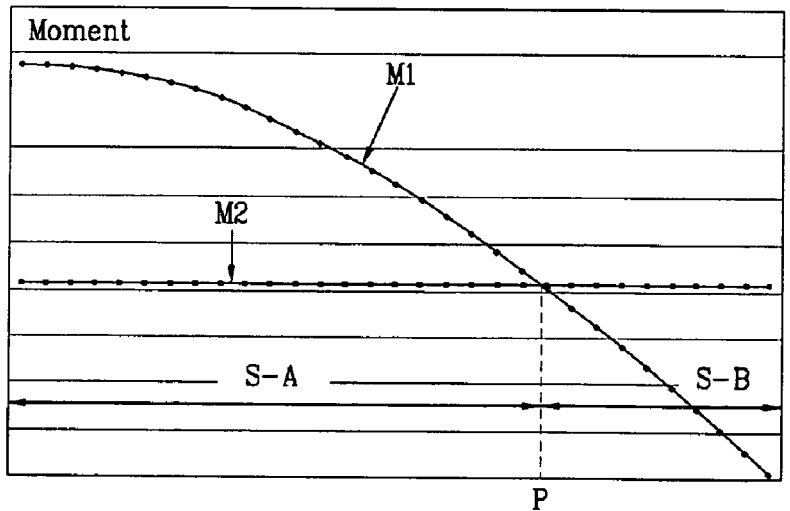

[Fig. 9]
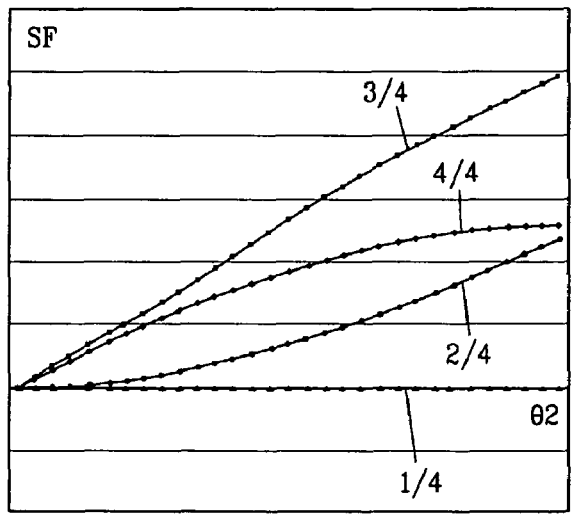
[Fig. 10]
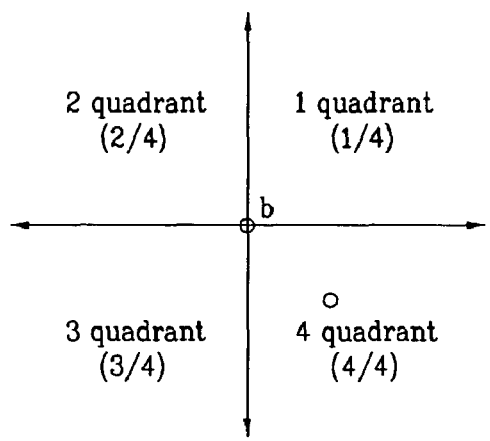
[Fig. 11]
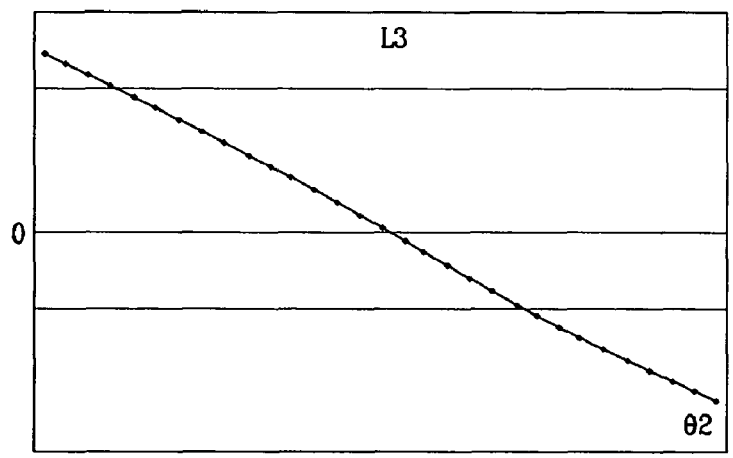

[Fig. 12]
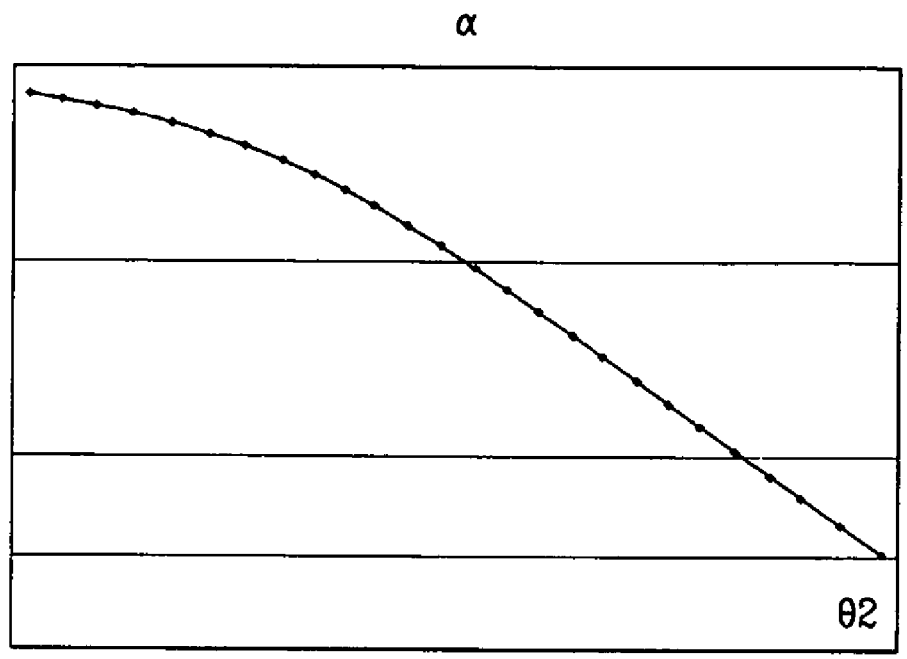
[Fig. 13]
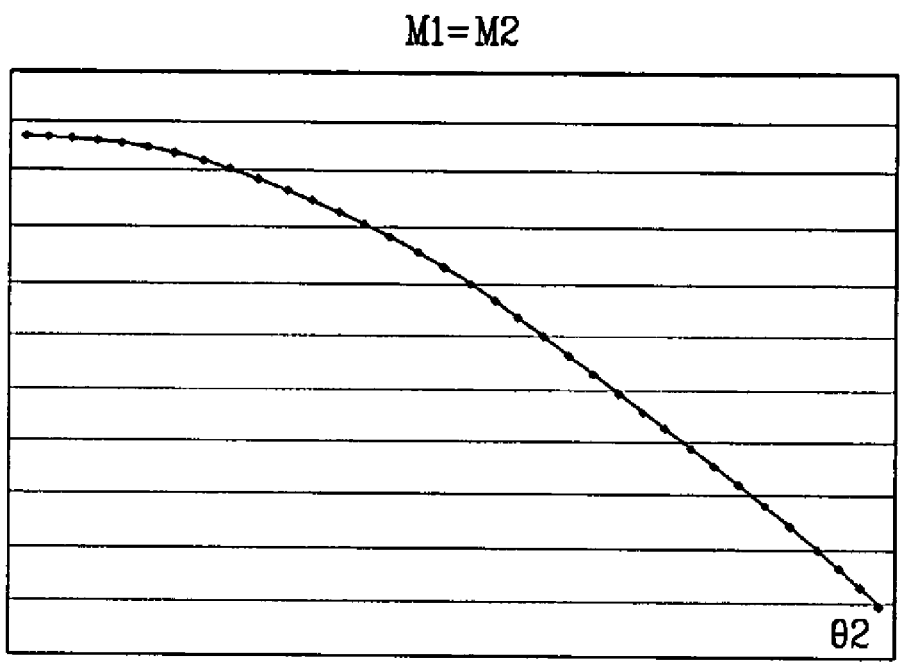

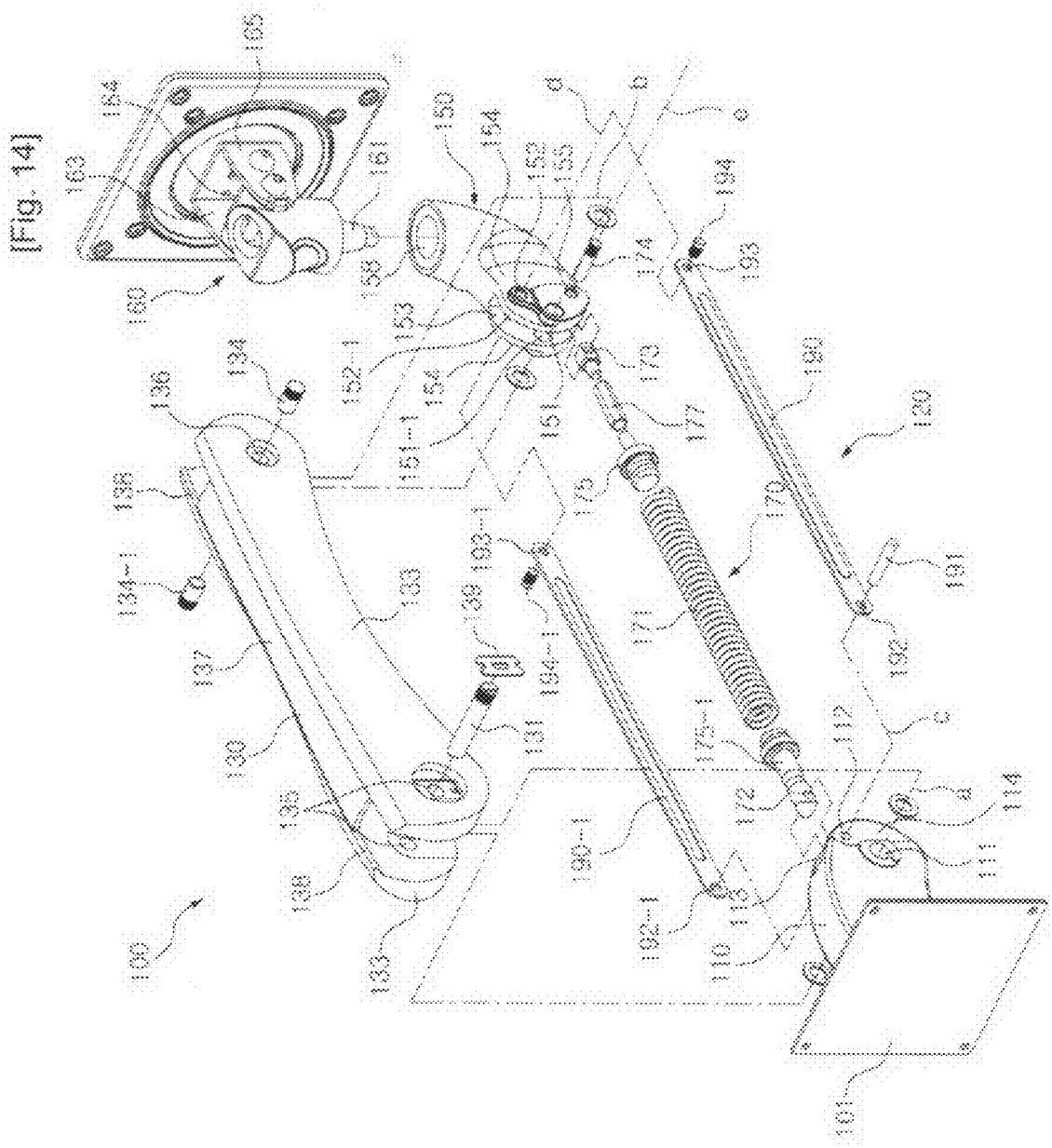

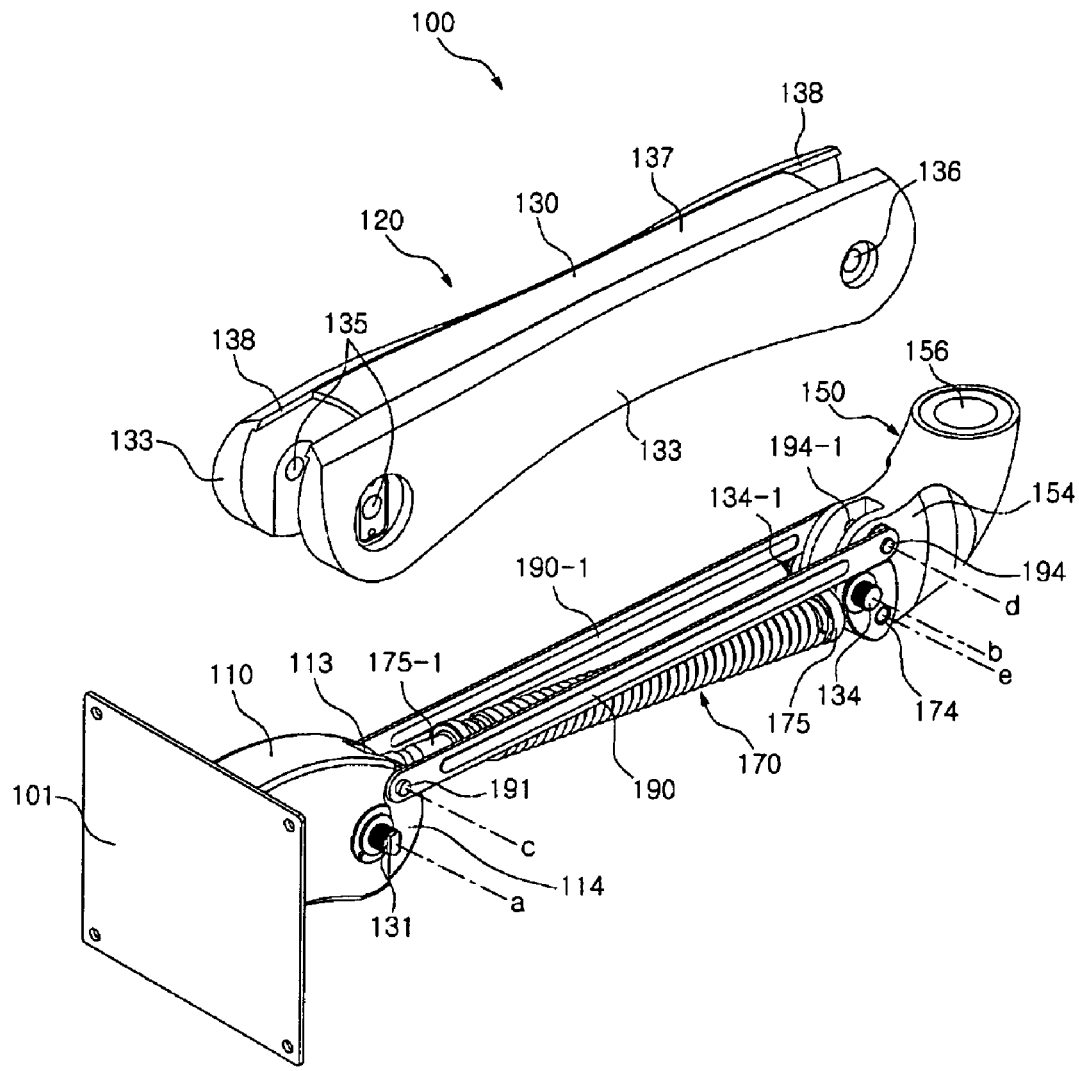
[Fig. 15]

[Fig. 16]
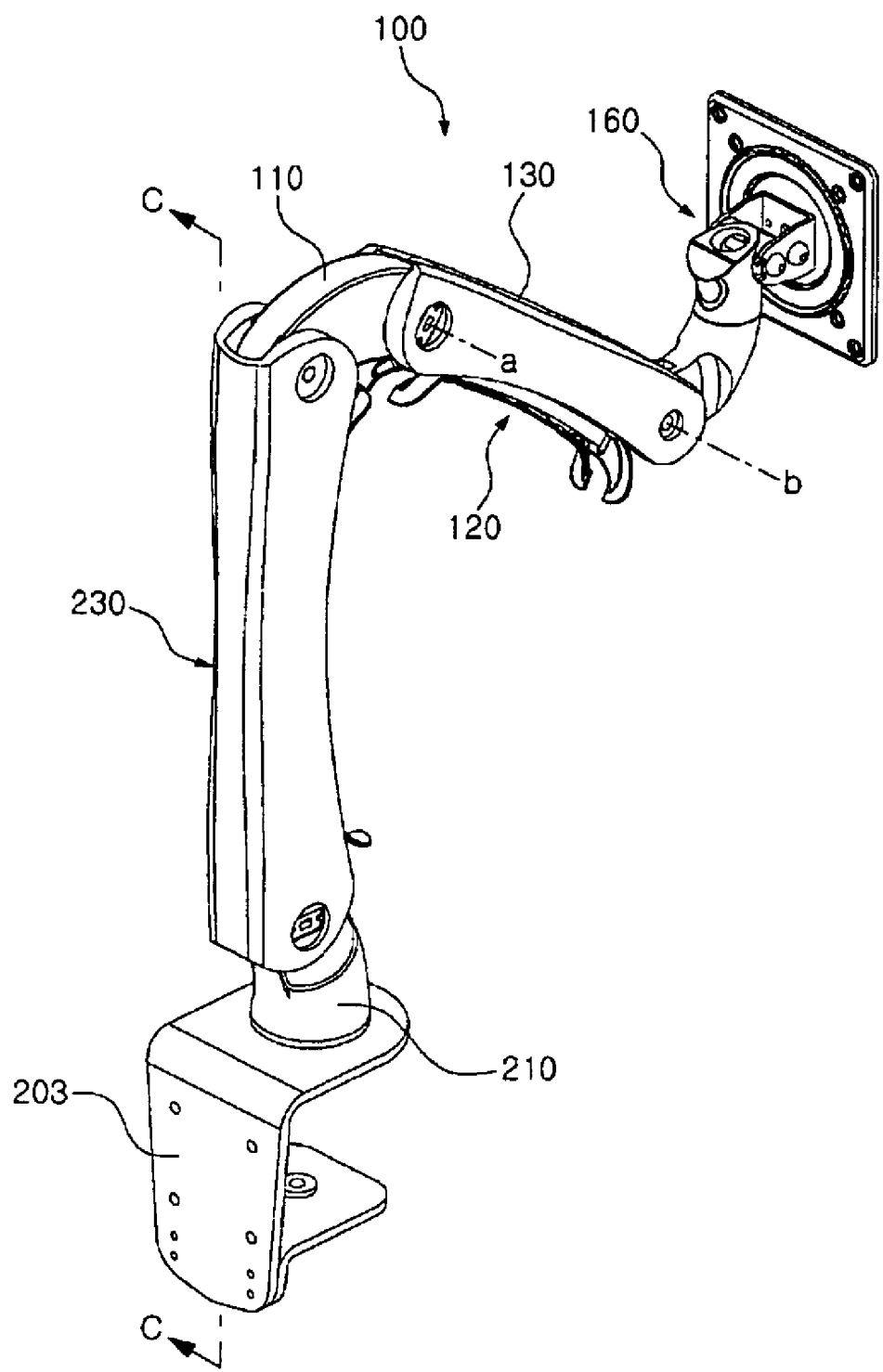

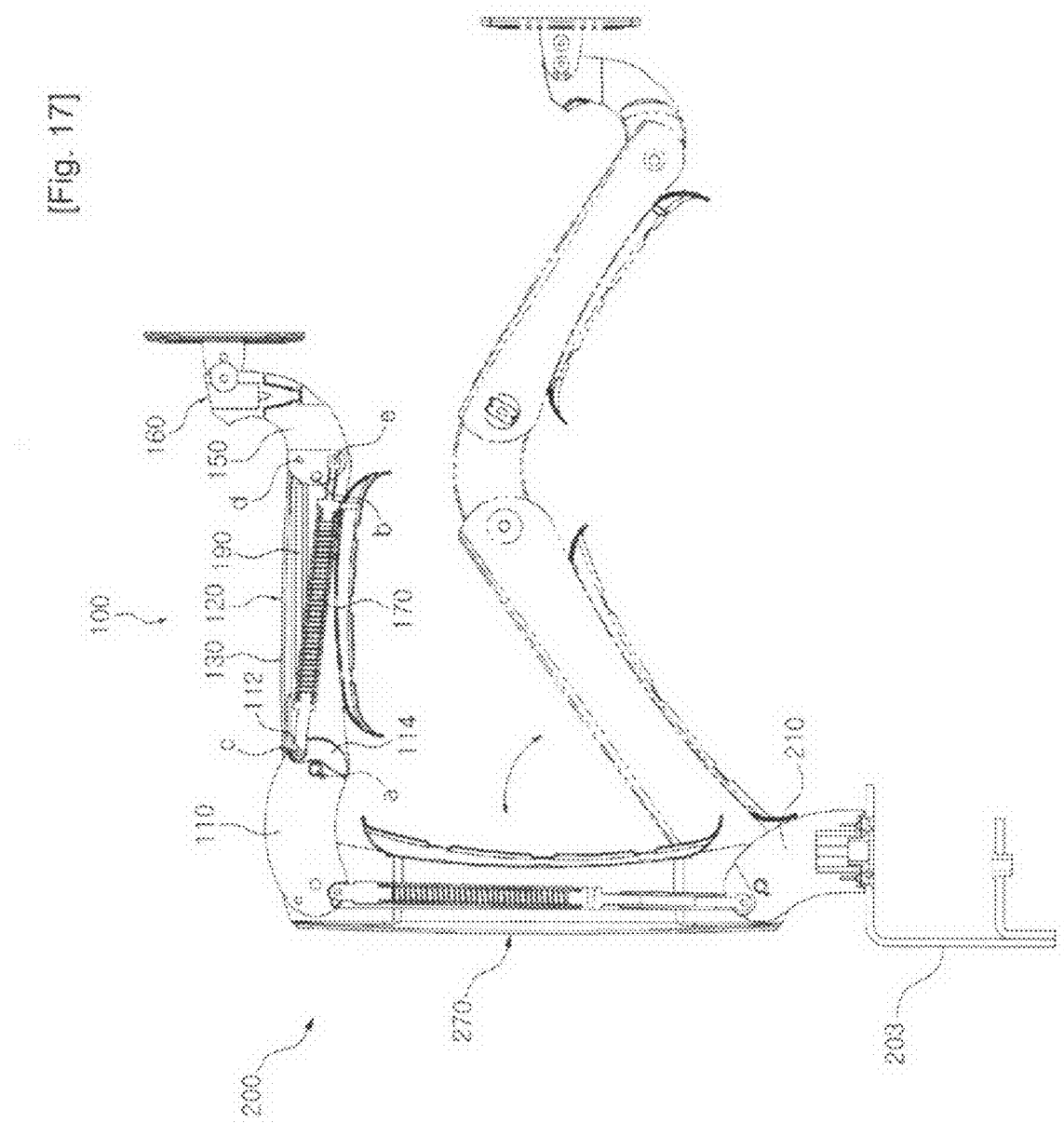

ARM STAND FOR DISPLAY UNIT

CROSS REFERENCE TO RELATED APPLICATIONS

This application is a continuation-in-part of international application number PCT/KR2008/004717, filed Jan. 7, 2008, which claims priority to Korean patent application number 10-2008-0001930, filed Jan. 7, 2008 and Korean patent application number 10-2008-0075045, filed Jul. 31, 2008. All of the above listed patent applications are incorporated herein by reference, in their entirety.

TECHNICAL FIELD

The present invention relates, in general, to arm stands which can easily adjust the positions of flat display units, such as LCDs or PDPs, and, more particularly, to an arm stand for a display unit which can maintain the display unit in a state of being stopped at any position.

BACKGROUND ART

Generally, display units are electronic devices, for example, TVs or monitors of computers, which produce images. Recently, flat display panels, such as LCDs (liquid crystal displays) or PDPs (plasma display panels) are gaining popularity and are thin despite having large-sized screens so that they can be installed not only on tables but also on walls, thus reducing the installation space.

Arm stands are used to support the flat display units, such as LCDs or PDPs, on walls or tables. Such an arm stand includes parallel links, at least one spring and a bracket and is constructed such that a position of a display unit can be adjusted.

However, in the conventional arm stand for the display unit, as the parallel links rotate, the elastic force of the spring is increased. Therefore, when the parallel links rotate beyond a predetermined angle, for example, beyond an angle of 40° to 45°, the parallel links are returned to their original positions. Thus, a range within which the height of the display unit can be adjusted is very small.

DISCLOSURE

[Technical Problem]

Accordingly, the present invention has been made keeping in mind the above problems occurring in the prior art, and an object of the present invention is to provide an arm stand for a display unit in which even though a rotary link unit is disposed at any position within a rotating trajectory range (0° to 90°), it can maintain a stationary state without being returned to its original position, thus increasing a range within which the height of the display unit can be adjusted.

[Technical Solution]

In order to accomplish the above object, the present invention provides an arm stand for a display unit which includes a mounting bracket fastened to a base, a horizontal bracket for supporting the display unit, and a rotary link unit provided between the mounting bracket and the horizontal bracket so as to be rotatable.

The mounting bracket is a plate fastened to the base. A base rotating axis is formed in this plate, and a first upper support axis is formed in the plate above the base rotating axis at a position spaced apart therefrom by a predetermined distance.

The horizontal bracket is a plate to which the display unit is mounted. A central rotating axis is formed in this plate, and a second upper support axis is formed in the plate above the central rotating axis at a position spaced apart therefrom by a predetermined distance. In addition, a lower support axis is formed in the plate below the central rotating axis at a position spaced apart therefrom by a predetermined distance.

The rotary link unit includes: a main rotary link which is rotatably provided between a base rotating axis of the mounting bracket and a central rotating axis of the horizontal bracket; an auxiliary rotary link which is rotatably provided between a first upper support axis formed in the mounting bracket above the base rotating axis and a second upper support axis formed in the horizontal bracket above the central rotating axis; and a tension spring which is rotatably provided between the first upper support axis formed above the base rotating axis of the mounting bracket and a lower support axis formed in the horizontal bracket below the central rotating axis.

The first upper support axis of the mounting bracket may be disposed above a right-hand side of the base rotating axis of the mounting bracket at a position spaced apart therefrom by a predetermined distance. The second upper support axis of the horizontal bracket may be disposed above a right-hand side of the central rotating axis of the horizontal bracket at a position spaced apart therefrom by a predetermined distance. The lower support axis of the horizontal bracket may be disposed below the right-hand side of the central rotating axis of the horizontal bracket at a position spaced apart therefrom by a predetermined distance.

The lower support axis of the horizontal bracket may be disposed at a predetermined point in a fourth quadrant of a quadrant graph having the central rotating axis of the horizontal bracket as an origin.

The first upper support axis, the lower support axis and the central rotating axis of the horizontal bracket may be arranged into a triangular shape having the central rotating axis as a vertex.

The tension spring may apply an elastic force and a moment to the main rotary link or the auxiliary rotary link such that when a predetermined weight (w) is applied to the horizontal bracket, a force (F1) applied to the main rotary link is identical with a force (F2) applied to the auxiliary rotary link, so that the main rotary link and the auxiliary rotary link are able to maintain a stationary state at any position.

The main rotary link may have a reverse U-shaped cross-section such that the tension spring and the auxiliary rotary link are contained in the main rotary link and oriented in a longitudinal direction of the main rotary link. Circular pin holes may be formed in both ends of the main rotary link. The circular pin holes respectively form the base rotating axis of the mounting bracket and the central rotating axis of the horizontal bracket.

The auxiliary rotary link may comprise a metal bar having predetermined width and length. Circular pin holes may be formed in both ends of the bar. The circular pin holes respectively form the first upper support axis of the mounting bracket and the second upper support axis of the horizontal bracket.

The tension spring may comprise a coil spring having a predetermined length. Connection rods may be coupled to both ends of the coil spring such that a length of the coil spring is adjustable. Through holes may be formed in ends of the respective connection rods. A support pin for forming the first upper support axis of the mounting bracket and a support pin for forming the lower support axis of the horizontal bracket may be respectively inserted into the through holes of the connection rods.

The mounting bracket may comprise a plate fastened to the base. A first insert recess may be formed in an end of the mounting bracket adjacent to the horizontal bracket. The first insert recess is open upwards and downwards such that a first end of the tension spring is inserted into the first, insert recess so as to be rotatable upwards and downwards. A rotary pin hole may be formed in a central portion of the plate forming the mounting bracket at a predetermined position other than the first insert recess, so that a support pin for rotatably supporting the main rotary link is inserted into the rotary pin hole. First seating depressions having predetermined depths may be formed in outer surfaces of opposite vertical sidewalls which are formed in the mounting bracket by forming the first insert recess. A first end of the auxiliary rotary link may be rotatably seated into the first seating depressions. First upper pin holes may be formed in the respective opposite vertical sidewalls above a right-hand side of the rotary pin hole. A support pin for rotatably supporting both the tension spring and the auxiliary rotary link may be inserted into the first upper pin holes.

The horizontal bracket may comprise a plate to which the display unit is mounted. A second insert recess may be formed in an end of the horizontal bracket adjacent to the mounting bracket. The second insert recess is open upwards and downwards such that a second end of the tension spring is inserted into the second insert recess so as to be rotatable upwards and downwards. Second seating depressions having predetermined depths may be formed in outer surfaces of opposite vertical sidewalls which are formed in the horizontal bracket by forming the second insert recess. A second end of the auxiliary rotary link may be rotatably seated into the second seating depressions. Central pin holes may be formed in central portions of the opposite sidewalls defining the second insert recess. A support pin for rotatably supporting the main rotary link is inserted into the central pin holes. Second upper pin holes may be formed above right-hand sides of the respective central pin holes. A support pin for rotatably supporting the auxiliary rotary link may be inserted into the second upper pin holes. Lower pin holes may be formed below the right-hand sides of the respective central pin holes. A support pin for rotatably supporting the tension spring is inserted into the lower pin holes.

Furthermore, a coupling hole may be formed in the horizontal bracket such that a rotating and tilting unit is coupled to the horizontal bracket through the coupling hole. The rotating and tilting unit rotates or tilts the display unit leftwards, rightwards, upwards or downwards to adjust a view angle thereof.

Advantageous Effects

In an arm stand for a display unit according to the present invention, a tension spring provided between a mounting bracket and a horizontal bracket applies elastic force to an auxiliary rotary link, the elastic force varying depending on rotation of a rotary link unit, so that when the rotary link unit is rotated by external force applied to the horizontal bracket, a force (F1) applied to a main rotary link is equal to a force (F2) applied to the auxiliary rotary link. Therefore, the rotary link unit can maintain the stationary state at any angle.

Furthermore, in the present invention, when the rotary link unit rotates, the horizontal bracket rotates around a central rotating axis in the opposite direction. Thus, the display unit can always maintain the upright state.

In addition, because the tension spring applies elastic force to the auxiliary rotary link such that the force (F1) applied to the main rotary link is equal to the force (F2) applied to the auxiliary rotary link, the rotary link unit can rotate at an angle of 90° or more. Therefore, the position of the display unit can be variously adjusted.

As well, without using complex components, such as cams, the present invention can realize the structure for maintaining the stationary state of the rotary link unit at any angle and the structure for increasing a range of the rotating angle of the rotary link unit. Hence, the construction of the arm stand is simple, thus reducing the production cost.

DESCRIPTION OF DRAWINGS

FIG. 1 is a perspective view illustrating an arm stand for a display unit according to an embodiment of the present invention;

FIG. 2 is a sectional view taken along the line A-A of FIG. 1;

FIG. 3 is a sectional view taken along the line B-B of FIG. 1;

FIG. 4 is a sectional view showing the operation of the arm stand according to the present invention;

FIG. 5 is a view showing the kinematic analysis of the arm stand including a main rotary link and an auxiliary rotary link according to the present invention;

FIG. 6 is a view showing the kinematic analysis of the arm stand including the main rotary link, the auxiliary rotary link and a tension spring according to the present invention;

FIG. 7 is a view showing a rotating trajectory of the arm stand of FIG. 6;

FIG. 8 is a graph showing variation of moments M1 and M2 of the arm stand including the main rotary link and the auxiliary rotary link shown in FIG. 5;

FIG. 9 is a graph showing variation of the elastic force of the tension spring according to the present invention;

FIG. 10 shows a quadrant expressed to determine a fixed position of the tension spring;

FIG. 11 is a graph showing variation of L3 depending on rotation of a rotary link unit according to the present invention;

FIG. 12 is a graph showing variation of the moment of the tension spring depending on the rotation of the rotary link unit according to the present invention;

FIG. 13 is a graph illustrating consistency between the moment M1 of the main rotary link and the moment M2 of the auxiliary rotary link according to the present invention;

FIG. 14 is an exploded perspective view illustrating an arm stand for a display unit according to another embodiment of the present invention;

FIG. 15 is a perspective view showing the coupling between an auxiliary rotary link and a tension spring of the arm stand according to the present invention;

FIG. 16 is a perspective view illustrating an arm stand for a display unit according to another embodiment of the present invention; and FIG. 17 is a sectional view taken along the line C-C of FIG. 16.

DESCRIPTION OF THE ELEMENTS IN THE DRAWINGS

100: arm stand 101: base
102: display unit 110: mounting bracket
111: rotary pin hole 113: first insert recess
114: first seating depression 120: rotary link unit
130: main rotary link 150: horizontal bracket
153: second insert recess 154: first seating depression
170: tension spring 175: connection rod 177: space bar 190: auxiliary rotary link
a: base rotating axis b: central rotating axis
c: first upper support axis d: second upper support axis
e: lower support axis P: dead point

[Best Mode]

Hereinafter, preferred embodiments of an arm stand for a display unit according to the present invention will be described in detail with reference to the attached drawings.

FIG. 1 is a perspective view illustrating an arm stand for a display unit according to an embodiment of the present invention. FIG. 2 is a sectional view taken along the line A-A of FIG. 1. FIG. 3 is a sectional view taken along the line B-B of FIG. 1.

Referring to the drawings, the arm stand for the display unit 100 (hereinafter, referred to as 'arm stand') according to the embodiment of the present invention includes a mounting bracket 110 which is fastened to a base 101, a horizontal bracket 150 which supports the display unit 102, and a rotary link unit 120 which is rotatably provided between the mounting bracket 110 and the horizontal bracket 150.

The mounting bracket 110 is a plate which has a predetermined thickness and is fastened to the base 101. A base rotating axis a is formed in this plate, and a first upper support axis c is formed in the plate above the base rotating axis a at a position spaced apart therefrom by a predetermined distance.

The horizontal bracket 150 is a plate which has a predetermined thickness and supports the display unit 102. A central rotating axis b is formed in this plate, and a second upper support axis d is formed in the plate above the central rotating axis b at a position spaced apart therefrom by a predetermined distance. In addition, a lower support axis e is formed in the plate below the central rotating axis b at a position spaced apart therefrom by a predetermined distance.

The rotary link unit 120 includes a main rotary link 130, an auxiliary rotary link 190 and a tension spring 170. The main rotary link 130 is rotatably provided between the base rotating axis a of the mounting bracket 110 and the central rotating axis b of the horizontal bracket 150. The auxiliary rotary link 190 is rotatably provided between the first upper support axis c of the mounting bracket 110 and the second upper support axis d of the horizontal bracket 150. The tension spring 170 is inclinedly provided at a predetermined angle between the first upper support axis c of the mounting bracket 110 and the lower support axis e of the horizontal bracket 150.

As shown in the drawings, the base rotating axis a of the mounting bracket 110 and the central rotating axis b of the horizontal bracket 150 are disposed in the same plane. The first upper support axis c of the mounting bracket 110 is disposed above the right-hand side of the base rotating axis a at a position spaced apart therefrom by a predetermined distance. The second upper support axis d of the horizontal bracket 150 is disposed above the right-hand side of the central rotating axis b at a position spaced apart therefrom by a predetermined distance, such that the first upper support axis c of the mounting bracket 110 and the second upper support axis d of the horizontal bracket 150 are disposed in the same plane.

Therefore, the main rotary link 130 which is provided between the base rotating axis a of the mounting bracket 110 and the central rotating axis b of the horizontal bracket 150, and the auxiliary rotary link 190 which is provided between the first upper support axis c of the mounting bracket 110 and the second upper support axis d of the horizontal bracket 150, are parallel to each other and are provided at lower and upper positions spaced apart from each other by a predetermined distance.

The first upper support axis c of the mounting bracket 110 is disposed above the right-hand side of the base rotating axis a at the position spaced apart therefrom by a predetermined distance, and the lower support axis e of the horizontal bracket 150 is disposed below the right-hand side of the central rotating axis b at a position spaced apart therefrom by a predetermined distance. Thus, the tension spring 170 which is provided between the first upper support axis c of the mounting bracket 110 and the lower support axis e of the horizontal bracket 150 is inclinedly provided at a predetermined angle such that it crosses over the main rotary link 130 and the auxiliary rotary link 190.

Furthermore, the second upper support axis d of the horizontal bracket 150 and the lower support axis e of the horizontal bracket 150 are disposed above and below the right-hand side of the central rotating axis b at positions corresponding to each other. Hence, the central rotating axis b, the second upper support axis d and the lower support axis e of the horizontal bracket 150 are disposed into a triangular shape having the central rotating axis b as a vertex.

Therefore, when an external force or load is applied to the horizontal bracket 150 of the arm stand according to the present invention, the main rotary link 130 rotates around the base rotating axis a of the mounting bracket 110 upwards or downwards at a predetermined angle (θ2: see, FIGS. 6 and 7). When the main rotary link 130 rotates upwards or downwards, the auxiliary rotary link 190 and the tension spring 170 which are connected to the main rotary link 130 rotate along with the main rotary link 130 in the same direction. Here, the auxiliary rotary link 190 and the tension spring 170 rotate around the first upper support axis c of the mounting bracket 110.

Meanwhile, when the main rotary link 130 rotates, the horizontal bracket 150 rotates around the central rotating axis b of the horizontal bracket 150 in the direction opposite the rotation of the main rotary link 130. That is, the horizontal bracket 150 is rotatably coupled to the rotary link unit including the main rotary link 130 and the auxiliary rotary link 190 which are parallel to each other. Hence, when the main rotary link 130 and the auxiliary rotary link 190 rotate, the horizontal bracket 150 rotates in the opposite direction and thus always maintains the horizontal state. Thereby, the display unit 102 that is mounted to the horizontal bracket 150 can always maintain an upright state regardless of the rotation of the main rotary link 130.

FIG. 4 is a view showing a rotating trajectory of the rotary link unit according to the present invention. As shown in the drawing, the rotary link unit 120 rotates within an angular range of about 90° between the horizontal state and the vertical state. With regard to the rotation of the rotary link unit 120, the main rotary link 130 which rotates around the base rotating axis a of the mounting bracket 110 moves along a rotating trajectory F. The auxiliary rotary link 190 which rotates around the first upper support axis c formed in the mounting bracket 110 moves along a rotating trajectory G. The tension spring 170 which rotates around the first upper support axis c formed in the mounting bracket 110 moves along a rotating trajectory H.

As such, the rotary link unit 120, in detail, the main rotary link 130 and the auxiliary rotary link 190, rotate along regular rotating trajectories, but the tension spring 170 moves along the irregular rotating trajectory H which has an inconstant radius of rotation, because the length thereof varies depending on the rotating angle of the rotating link unit 120. Here, the variation in length of the tension spring 170 depending on the rotating angle of the rotating link unit 120 means that the elastic force of the tension spring 170 varies depending on the rotating angle.

Furthermore, when the rotary link unit 120 rotates, a perpendicular distance (L3: see, FIG. 6) between the tension spring 170 and the auxiliary rotary link 190 varies depending on the rotating angle of the rotary link unit 120. This means that the moment of force applied to the auxiliary rotary link 190 varies depending on the rotating angle of the tension spring 170. This phenomenon can be realized by a construction in which the tension spring 170 which is extensible in the longitudinal direction and is inclinedly provided relative to the auxiliary rotary link 190 at a predetermined angle can cross both over the main rotary link 130 which is coupled to the central rotating axis b of the horizontal bracket 150 and over the auxiliary rotary link 190 which is coupled to the second upper support axis d of the horizontal bracket 150.

For example, when the main rotary link 130 rotates downwards, the auxiliary rotary link 190 and the tension spring 170 also rotate downwards. At this time, the auxiliary rotary link 190 which is parallel to the main rotary link 130 pulls the horizontal bracket 150 towards the mounting bracket 110 such that the horizontal bracket 150 rotates around the central rotating axis b in the opposite direction, that is, upwards. As such, when the horizontal bracket 150 rotates upwards, the second upper support axis d and the lower support axis e which are formed in the horizontal bracket 150 also rotate upwards along with the horizontal bracket 150.

Therefore, the tension spring 170 which is coupled to the lower support axis e rotates upwards around the first upper support axis c of the mounting bracket 110, so that the distance between the tension spring 170 and the auxiliary rotary link 190 is reduced and, simultaneously, the tension spring 170 is extended. At this time, the elastic force of the tension spring 170 is increased, compared to that when the rotary link unit 120 is horizontal, but the moment applied to the auxiliary rotary link 190 is reduced, because the distance between the tension spring 170 and the auxiliary rotary link 190 is reduced.

Thereafter, when the tension spring 170 is completely aligned with the main rotary link 130, defined is a dead point P at which the elastic force of the tension spring 170 which has been applied to the auxiliary rotary link 190 is removed.

When the rotary link unit 120 rotates beyond and below the dead point P, a reversion phenomenon occurs, in which the elastic force of the tension spring 170 and the moment which have been applied to the auxiliary rotary link 190 are applied to the main rotary link 130. As the rotary link unit 120 continuously rotates, the distance between the tension spring 170 and the main rotary link 130 is increased, so that the moment applied to the main rotary link 130 by the tension spring 170 is increased.

The rotating trajectory F of the rotary link unit 120 is divided into a section S-A and a section S-B based on the dead point at which the reversion phenomenon occurs.

As such, because the direction in which the restoring force (elastic force and moment) of the tension spring 170 is applied is reversed based on the dead point P, the rotary link unit 120 can rotate upwards and downwards within an angular range of 90° and maintain the stationary state at any rotating angle. However, in the conventional arm stand, because the direction of the restoring force of the spring cannot be reversed, if the rotary link unit rotates beyond the dead point (40°~45°), it cannot maintain the rotated position due to an increased restoring force. Thus, in the conventional arm stand, the position of the display unit must be adjusted only within a relatively small rotating angular range from 40° to 45°.

The operation and principle of the arm stand according to the present invention will be explained in detail with reference to the attached drawings.

FIGS. 5 through 7 are views showing the kinematic analysis of the arm stand according to the present invention. FIG. 5 shows movement of the main rotary link 130 and the auxiliary rotary link 190 between the mounting bracket 110 and the horizontal bracket 150. FIG. 6 shows the main rotary link 130, the auxiliary rotary link 190 and the tension spring 170 between the mounting bracket 110 and the horizontal bracket 150. FIG. 7 shows the rotating trajectory of the rotary link unit.

As shown in FIG. 5, when a load W is applied to the horizontal bracket 150, the main rotary link 130 and the auxiliary rotary link 190 which are provided in parallel at upper and lower positions spaced apart from each other by a predetermined distance are rotated by the load W downwards. At this time, a force F1 is applied to the main rotary link 130 towards the horizontal bracket. A force F2 is applied to the auxiliary rotary link 190 towards the mounting bracket.

In detail, when the load W is applied to the horizontal bracket 150, because the main rotary link 130 is basically rotated around the base rotating axis a of the mounting bracket 110, the force F1 acting towards the horizontal bracket is applied to the main rotary link 130. On the other hand, when the auxiliary rotary link 190 rotates downwards around the first upper support axis c of the mounting bracket 110, the force F2 acting to rotate the horizontal bracket 150 around the central rotating axis b of the horizontal bracket in the opposite direction is applied to the auxiliary rotary link 190. Here, when the force F1 is identical with the force F2, the main rotary link 130 and the auxiliary rotary link 190 stop at that position.

If the force F1 is greater than the force F2, the rotary link unit 120 does not stop but rotates downwards. At this time, the horizontal bracket 150 is intended to be rotated downwards by the force F1 applied to the main rotary link 130 and, simultaneously, it is intended to be rotated around the central rotating axis b upwards by the force F2 applied to the auxiliary rotary link 190. Hence, the horizontal bracket 150 always maintains the horizontal state.

Furthermore, the horizontal bracket 150 moves downwards until the force F1 is identical with the force F2. Typically, an angular position at which the forces F1 and F2 of the main rotary link 130 and the auxiliary rotary link 190 are identical with each other is between about 40° and about 45°. Therefore, the horizontal bracket 150 stops at a position at which the rotating angle of the rotary link unit 120 ranges from 40° to 45°. However, if the position at which the forces F1 and F2 are identical with each other is limited to a special angular range from 40° to 45°, a user cannot stop the horizontal bracket 150 at a position higher than that corresponding to the special angular range.

To solve this problem, the arm stand according to the present invention is constructed such that the resultant force of the force F1 applied to the main rotary link 130 and the force F2 applied to the auxiliary rotary link 190 is always zero. Thus, the horizontal bracket 150 can stop at any position in the entire range (sections S-A and S-B), within which the rotary link unit 120 rotates, or within which the horizontal bracket 150 moves upwards or downwards. In other words, the horizontal bracket 150 can maintain the stationary state at any position.

Referring to FIG. 5, the force F1 applied to the main rotary link 130 is a moment (M1: see, FIG. 8) which is obtained by multiplying the load W applied to the horizontal bracket 150 by the distance L1 between the base rotating axis a of the mounting bracket 110 and the central rotating axis b of the horizontal bracket 150. The force F2 applied to the auxiliary rotary link 190 is a moment (M2: see, FIG. 8) which is obtained by multiplying the load W applied to the horizontal bracket 150 by the distance L2 between the central rotating axis b of the horizontal bracket 150 and the gravity center G of the load W applied to the horizontal bracket 150.

Hence, M1=M2 must be satisfied when F1=F2.

$$M1 = W \times L1 \quad (1.1)$$

$$M2 = W \times L2 \quad (1.2)$$

In the formulas 1.1 and 1.2, W is a load applied to the horizontal bracket 150 and is thus constant, and L2 is a variable which varies depending on rotation of the rotary link unit 120.

Therefore, to satisfy the conditions of M1=M2, the arm stand is designed such that L2 is identical with L1. However, the size of the horizontal bracket 150 must be largely increased to make L2 equal to L1, so that it is actually impossible.

Ultimately, to change a state of an inequality of M1>M2 to a state of an equality of M1=M2, external force corresponding to $\alpha$ (=M1−M2) must be added to M2, and vice-versa.

That is, $M1 = M2 + \alpha \quad (1.3)$

For this, in the arm stand according to the present invention, as shown in FIG. 6, the tension spring 170 is installed between the first upper support axis c of the mounting bracket 110 and the lower support axis e of the horizontal bracket 150. Here, the lower support axis e of the horizontal bracket 150 is disposed below the right-hand side of the central rotating axis b of the horizontal bracket 150. Furthermore, the tension spring 170 is configured such that it can cross over the central rotating axis b of the horizontal bracket 150 and move upwards relative to the central rotating axis b. The construction of the horizontal bracket 150 for achieving this purpose will be explained later.

As shown in the enlarged circled portion of FIG. 6, a perpendicular distance between the central rotating axis b of the horizontal bracket 150 and the tension spring 170 is designated by L3. In addition, an angle between the tension spring 170 and a line connecting the central rotating axis b of the horizontal bracket 150 to the lower support axis e is designated by θ. A distance between the central rotating axis b and the lower support axis e is designated by L4. Here, L3 and θ are variables which vary depending on the rotation of the tension spring 170 or the horizontal bracket 150. L4 is a constant. Therefore, L3 according to θ is obtained by the following formula:

$$L3 = L4 \times \cos\theta \times \tan\theta \quad (1.4),$$

and a moment a of the tension spring 170 is obtained by the following formula:

$$\alpha = L3 \times SF \quad (1.5).$$

Here, SF (spring force) is elastic force which varies depending on a length of the tension spring 170.

Hence, when substituting the formula 1.5 into the formula 1.3, the following formula is obtained:

$$M1 = M2 + (SF \times L3) \quad (1.6).$$

Ultimately, to change the state of M1>M2 to the state of M1=M2, an elastic moment of a must be added to M2. To achieve this purpose, in the arm stand according to the present invention, the tension spring 170 is installed, so that force of L3×SF is applied to the auxiliary rotary link. Conversely, in the section of M1<M2, to satisfy the condition of M1=M2, an elastic moment of a must be subtracted from M2, or force of L3×SF must be applied to the main rotary link.

That is, in the present invention, the tension spring 170 is provided to apply the force of L3×SF to the auxiliary rotary link or the main rotary link depending on the rotating angle of the rotary link unit 120. Thus, the horizontal bracket 150 can maintain the stationary state at any position in the entire moving range.

Meanwhile, FIG. 7 is a view corresponding to FIG. 4 to illustrate variation of the moments M1 and M2 depending on the rotation of the rotary link unit.

As shown in the drawing, the rotating trajectory of the rotary link unit 120 is divided into the section S-A and the section S-B. When the rotary link unit 120 rotates downwards from the horizontal state and enters the second S-B beyond the section S-A, the point P at which the intensities of M1 and M2 are reversed arises.

This point P is called a dead point. As a kinetic term, the dead point means a point at which external force is applied to a shaft only in the direction aligned with the axis of the shaft, so that any rotating force is not applied thereto. In other words, at the point P, M1=M2 is satisfied, and the moment a applied to the tension spring 170 becomes zero. Therefore, a must be added to or subtracted from M2 on the basis of the dead point P in order to satisfy the condition of M1=M2 in the entire trajectory of the rotary link unit 120.

FIG. 8 is a graph showing variation of the moments M1 and M2 in the arm stand. As shown in the graph, the moment M2 applied to the auxiliary rotary link 190 is constant regardless of the rotation of the rotary link unit 120. Hence, in the section S-A ranging from the position of the horizontal state of the rotary link unit 120 to the dead point P, the moment M1 applied to the main rotary link 130 is greater than the moment M2. However, at the dead point P, the moments M1 and M2 are reversed. In the section S-B ranging from the dead point P to the position of the vertical state of the rotary link unit 120, the moment M1 is less than the moment M2. To satisfy the condition of M1=M2 in the entire range (including the sections S-A and S-B) within which the rotary link unit 120 rotates, a difference ($|\alpha|$=M1−M2) between M1 and M2 which is obtained on the basis of the dead point P must be compensated for.

FIG. 9 is a graph showing variation of the elastic force of the tension spring 170 according to the present invention. FIG. 10 is a view showing a quadrant which is sectioned based on the central rotating axis b of the horizontal bracket 150 to determine the fixed position e of the tension spring 170. In detail, a first end of the tension spring 170 is fastened to the first upper support axis c of the mounting bracket 110, and a second end thereof is fastened to one point on the quadrant of the horizontal bracket 150. Thereafter, the elastic force of the tension spring 170 is measured. Here, the horizontal bracket 150 rotates around the central rotating axis b, of course.

Referring to FIG. 9, an inflection point of a graph showing variation in the elastic force SF of the tension spring 170 when the rotary link unit 120 rotates downwards from the horizontal state occurs only when the fixed position e is formed in the fourth quadrant (4/4). To satisfy the condition of M1=M2 in the entire range within which the rotary link unit 120 rotates, the graph showing variation in the elastic force of the tension spring has at least one inflection point. Therefore, it is appreciated that the fixed position e of the tension spring must be formed in the fourth quadrant (4/4).

FIG. 11 is a graph showing variation of L3 depending on the rotation of the rotary link unit 120. As shown in the graph, the perpendicular distance between the tension spring and the central rotating axis of the horizontal bracket is reduced or increased depending on the rotating angle (θ2) of the rotary link unit 120.

Therefore, the moment a (=L3×SF) shown in the formula 1.5 can be obtained by multiplying the elastic force SF of the tension spring fixed to the fourth quadrant (4/4) of FIG. 9 by the perpendicular distance L3 shown in FIG. 11.

FIG. 12 is a graph showing variation of the moment a of the tension spring depending on the rotating angle θ2 of the rotary link unit 120. As shown in the drawing, the graph showing variation of the moment a of the tension spring depending on the rotation of the rotary link unit 120 is equal to that of the moment M1 of the main rotary link shown in FIG. 8.

Therefore, according to M1=M2+(SF×L3) of the formula 1.6, when α (SF×L3) obtained in FIG. 12 is added to M2 shown in FIG. 8, a graph of M2=M1 can be obtained, as shown in FIG. 13.

As described above, in the arm stand according to the present invention, to satisfy the condition of F1=F2, the tension spring 170 is fastened to the lower support axis e which is disposed in the fourth quadrant of the horizontal bracket 150, so that the moment a of the tension spring 170 which varies depending on the rotation of the rotary link unit 120 is added to the moment M2 of the auxiliary rotary link. Thus, the rotary link unit 120 can freely stop at any position in the entire rotating range thereof.

Hereinafter, the construction of the arm stand according to the present invention will be described in more detail. In particular, the following description will be focused on the structure such that the tension spring 170 can cross over the central rotating axis b and the second upper support axis d of the horizontal bracket 150 while rotating around the first upper support axis c of the mounting bracket 110.

FIG. 14 is an exploded perspective view illustrating the arm stand according to the present invention. FIG. 15 is a perspective view showing the coupling between the auxiliary rotary link and the tension spring of the arm stand.

As shown in the drawings, the arm stand 100 of the present invention includes the mounting bracket 110, the rotary link unit 120 and the horizontal bracket 150. The rotary link unit 120 includes the tension spring 170 and two auxiliary rotary links 190 and 190-1.

The mounting bracket 110 is a plate which is made of metal or plastic having predetermined length and width. Furthermore, a first end of the mounting bracket 110 is fastened to the base 101. Preferably, the base 101 is fastened to a wall surface, such as a vertical wall or an inclined wall.

As well, a rotary pin hole 111 is formed in the central portion of a second end of the mounting bracket 110, so that a support pin 131 to which the main rotary link 130 is rotatably coupled is fitted into the rotary pin hole 111. The base rotating axis of the mounting bracket 110 is defined by the coupling of the support pin 131 to the rotary pin hole 111.

In addition, a first insert recess 113 is formed in the second end of the mounting bracket 110, so that the first end of the tension spring 170 is inserted into the first insert recess 113. The first insert recess 113 extends to the upper and lower surfaces of the second end of the mounting bracket 110 such that the tension spring 170 can rotate upwards and downwards. A first seating depression 114 having a predetermined depth is formed in the outer surface of each of the opposite vertical sidewalls which are formed in the second end of the mounting bracket 110 by forming the first insert recess 113. A first end of each auxiliary rotary link 190, 190-1 is rotatably seated into the corresponding first seating depression 114.

As well, first upper pin holes 112 are formed in the respective first seating depressions 114, and a support pin 191 is fitted into the first upper pin holes 112. The tension spring 170 and the auxiliary rotary links 190 and 190-1 are rotatably coupled to the support pin 191. The first upper pin holes 112 are disposed above the right-hand side of the rotary pin hole 111. The first upper support axis c is defined by the coupling of the support pin 191 to the first upper pin holes 112.

The main rotary link 130 has a reverse U-shaped cross-section to form a space for receiving the tension spring 170 and the two auxiliary rotary links 190 and 190-1 therein. Preferably, the main rotary link 130 is made of metal, such as aluminum, through a molding process. As shown in the drawings, the main rotary link 130 includes two vertical plates 133 which are spaced apart from each other by a predetermined distance. Through holes 135, into which the support pins 131 and 134 are fitted, are formed through both ends of the two vertical plates 133. Furthermore, a depression, in which a rotation prevention clip 139 is installed, is preferably formed around each through hole 135. In addition, a horizontal plate 137 is provided between the upper ends of the two vertical plates 133. Openings 138 are formed in the both ends of the horizontal plate 137 to prevent interference with the rotation of the main rotary link 130 and the horizontal bracket 150 within predetermined ranges.

The tension spring 170 comprises a coil spring 171 having a predetermined length. Connection rods 175 and 175-1 having predetermined lengths are connected to the respective both ends of the coil spring 171. An external thread is formed on each connection rod 175, 175-1 such that the connection rod 175, 175-1 is threadedly coupled to the corresponding end of the coil spring 171. A through hole 172, into which the support pin 191 is fitted, is formed through the outer surface of the connection rod 175-1. A through hole 173, into which a lower support pin 174 is fitted, is formed through the other connection rod 175. The lower support axis e is defined by the coupling of the lower support pin 174 to the through hole 173 and a lower pin hole 155.

Meanwhile, both ends of the tension spring 170 may be integrally connected to circular, semicircular or U-shaped hooks, in place of being connected to the connection rods 175 and 175-1. A space bar 177 may be further provided on the connection rod 175 to adjust the length of the tension spring 170. The length of the tension spring 170 is adjusted by rotating the space bar 177, thus adjusting the elastic force of the tension spring 170. That is, depending on the weight of the display unit 102 which is mounted to the horizontal bracket 150, the elastic force of the tension spring 170 can be adjusted by using the space bar 177.

The auxiliary rotary links 190 and 190-1 are metal bars having through holes 192, 192-1, 193 and 193-1 in both ends thereof. The auxiliary rotary links 190 and 190-1 are provided on opposite sides of the tension spring 170 and are parallel to each other. First ends of the auxiliary rotary links 190 and 190-1 are coupled to the first upper pin holes 112 of the mounting bracket 110 by the support pin 191 which is fitted into the through holes 192 and 192-1. Furthermore, second ends of the auxiliary rotary links 190 and 190-1 are coupled to second upper pin holes 152 and 152-1 of the horizontal bracket 150 by upper support pins 194 and 194-1 which are fitted into the through holes 193 and 193-1.

As such, the support pin 191 and the first upper pin holes 112 form the first upper support axis c. The upper support pins

194 and 194-1, the through holes 193 and 193-1 and the second upper pin holes 152 and 152-1 form the second upper support axis d.

The horizontal bracket 150 is made of metal or plastic plate which is bent upwards on a second end thereof. A second insert recess 153 into which the second end of the tension spring 170 is inserted is formed in a first end of the horizontal bracket 150. The second insert recess 153 is open upwards and downwards to allow the tension spring 170 to rotate upwards or downwards. A second seating depression 154 is formed in the outer surface of each of the opposite vertical sidewalls which are formed in the first end of the horizontal bracket 150 by forming the second insert recess 153. A second end of each auxiliary rotary link 190, 190-1 is rotatably seated into the corresponding second seating depression 154.

Furthermore, the opposite vertical sidewalls of the second insert recess 153 have therein central pin holes 151 and 151-1 for rotatably coupling the main rotary link 130 to the horizontal bracket 150, lower pin holes 155 and 155-1 for rotatably the tension spring 170 thereto, and the second upper pin holes 152 and 152-1.

The support pins 134 and 134-1 which are fitted into through holes 136 formed in the main rotary link 130 are respectively inserted into the central pin holes 151 and 151-1, thus forming the central rotating axis b, around which the horizontal bracket 150 rotates. The lower support pin 174 which passes through the through hole 173 formed in the second end of the tension spring 170 is fitted into the lower pin holes 155 and 155-1. Here, the lower support pin 174 crosses the second insert recess 153 and thus forms the lower support axis e, around which the tension spring 130 rotates.

Meanwhile, a rotating and tilting unit 160 which rotates the display unit 102 to the left or right and adjusts the view angle thereof upwards or downwards is coupled to the second end of the horizontal bracket 150. For this, a conical coupling hole 158 is formed in the central portion of the bent part of the second end of the horizontal bracket 150, and a horizontal rotating member 161 for rotating the display unit 102 in the horizontal direction is inserted into the conical coupling hole 158. A tilting member 160 for tilting the display unit 102 upwards or downwards is coupled to the upper end of the horizontal rotating member 161.

The display unit 102 which has been illustrated in the present invention is a flat display device, such as an LCD or PDP, which produces an image. However, the display unit 102 of the present invention is not limited to these and may also include a cathode ray tube (CRT) or other image creating device. Furthermore, in the drawings, although the base 101 has been illustrated as being a metal plate fastened to the vertical surface, the base 101 is not limited to this and may also include other kinds of plates to be fastened to an inclined surface or a horizontal surface.

FIG. 16 is a perspective view illustrating an arm stand for a display unit according to another embodiment of the present invention. FIG. 17 is a sectional view taken along the line C-C of FIG. 16.

As shown in the drawings, in an arm stand 100 according to this embodiment, a mounting bracket 110 is coupled to a left and right turning unit 230 having a predetermined height. The left and right turning unit 230 has a structure similar to that of the arm stand according to the conventional technique. For example, the left and right turning unit 230 includes a second mounting bracket 210 which is fastened to a horizontal base 203, a second rotary link unit 270 which is coupled to the upper end of the second mounting bracket 210 so as to be rotatable to the left or right, and a second horizontal bracket which is coupled to the upper end of the second rotary link unit 270 so as to be rotatable to the left or right. Here, the second horizontal bracket is the mounting bracket 110. That is, the mounting bracket 110 can always maintain the horizontal state and support the first rotary link unit 120 such that the first rotary link unit 120 can rotate around the second end of the mounting bracket 110.

As described above, in the arm stand for display units according to the present invention, because the tension spring is coupled to the lower support axis of the horizontal bracket to apply predetermined elastic force to the rotary link unit, the horizontal bracket can freely stop at any position in the entire range within which the horizontal bracket moves. Furthermore, the arm stand of the present invention is constructed such that the tension spring can cross over the central rotating axis to which the main rotary link is coupled. Thus, the rotary link unit can rotate at an angle beyond 90°.

The invention claimed is:

1. An arm stand for a display unit comprising a mounting bracket fastened to a base, a horizontal bracket for supporting the display unit, and a rotary link unit provided between the mounting bracket and the horizontal bracket so as to be rotatable, the rotary link unit comprising:
   a main rotary link rotatably provided between a base rotating axis of the mounting bracket and a central rotating axis of the horizontal bracket;
   an auxiliary rotary link rotatably provided between a first upper support axis formed in the mounting bracket above the base rotating axis and a second upper support axis formed in the horizontal bracket above the central rotating axis; and
   a tension spring rotatably provided between the first upper support axis formed above the base rotating axis of the mounting bracket and a lower support axis formed in the horizontal bracket below the central rotating axis, wherein
   the main rotary link and the auxiliary rotary link are disposed at upper and lower positions spaced apart from each other by a predetermined distance and are parallel to each other, and the tension spring is inclined at a predetermined angle with respect to the main rotary link and the auxiliary rotary link.

2. The arm stand according to claim 1, wherein the first upper support axis of the mounting bracket is disposed above a right-hand side of the base rotating axis of the mounting bracket at a position spaced apart therefrom by a predetermined distance, and the second upper support axis of the horizontal bracket is disposed above a right-hand side of the central rotating axis of the horizontal bracket at a position spaced apart therefrom by a predetermined distance, and the lower support axis of the horizontal bracket is disposed below the right-hand side of the central rotating axis of the horizontal bracket at a position spaced apart therefrom by a predetermined distance.

3. The arm stand according to claim 1, wherein the lower support axis of the horizontal bracket is disposed at a predetermined point in a fourth quadrant (4/4) of a quadrant graph having the central rotating axis of the horizontal bracket as an origin.

4. The arm stand according to claim 3, wherein the first upper support axis, the lower support axis and the central rotating axis of the horizontal bracket are arranged into a triangular shape having the central rotating axis as a vertex.

5. The arm stand according to claim 1, wherein the tension spring applies an elastic force and a moment to the main rotary link or the auxiliary rotary link such that when a predetermined weight (w) is applied to the horizontal bracket, a force (F1) applied to the main rotary link is identical with a force (F2) applied to the auxiliary rotary link, so that the main rotary link and the auxiliary rotary link are able to maintain a stationary state at any position.

6. The arm stand according to claim 1, wherein the main rotary link has a reverse U-shaped cross-section such that the tension spring and the auxiliary rotary link are contained in the main rotary link and oriented in a longitudinal direction of the main rotary link, and circular pin holes are formed in both ends of the main rotary link, the circular pin holes respectively forming the base rotating axis of the mounting bracket and the central rotating axis of the horizontal bracket.

7. The arm stand according to claim 1, wherein the auxiliary rotary link comprises a bar having predetermined width and length, and circular pin holes are formed in both ends of the bar, the circular pin holes respectively forming the first upper support axis of the mounting bracket and the second upper support axis of the horizontal bracket.

8. The arm stand according to claim 1, wherein the tension spring comprises a coil spring having a predetermined length, wherein connection rods are coupled to both ends of the coil spring such that a length of the coil spring is adjustable, and through holes are formed in ends of the respective connection rods, and a support pin for forming the first upper support axis of the mounting bracket and a support pin for forming the lower support axis of the horizontal bracket are respectively inserted into the through holes of the connection rods.

9. The arm stand according to claim 1, wherein the mounting bracket has: a first insert recess formed in an end of the mounting bracket adjacent to the horizontal bracket, the first insert recess being open upwards and downwards such that a first end of the tension spring is inserted into the first insert recess so as to be rotatable upwards and downwards; a rotary pin hole formed in a central portion of a plate forming the mounting bracket at a predetermined position other than the first insert recess, so that a support pin for rotatably supporting the main rotary link is inserted into the rotary pin hole; first seating depressions formed in outer surfaces of opposite vertical sidewalls which are formed in the mounting bracket by forming the first insert recess, the first seating depressions having predetermined depths, wherein a first end of the auxiliary rotary link is rotatably seated into the first seating depressions; and first upper pin holes formed in the respective opposite vertical sidewalls above a right-hand side of the rotary pin hole, wherein a support pin for rotatably supporting both the tension spring and the auxiliary rotary link is inserted into the first upper pin holes.

10. The arm stand according to claim 1, wherein the horizontal bracket has: a second insert recess formed in an end of the horizontal bracket adjacent to the mounting bracket, the second insert recess being open upwards and downwards such that a second end of the tension spring is inserted into the second insert recess so as to be rotatable upwards and downwards; second seating depressions formed in outer surfaces of opposite vertical sidewalls which are formed in the horizontal bracket by forming the second insert recess, the second seating depressions having predetermined depths, wherein a second end of the auxiliary rotary link is rotatably seated into the second seating depressions; central pin holes formed in central portions of the opposite sidewalls defining the second insert recess, wherein a support pin for rotatably supporting the main rotary link is inserted into the central pin holes; second upper pin holes formed above right-hand sides of the respective central pin holes, wherein a support pin for rotatably supporting the auxiliary rotary link is inserted into the second upper pin holes; and lower pin holes formed below the right-hand sides of the respective central pin holes, wherein a support pin for rotatably supporting the tension spring is inserted into the lower pin holes.

11. The arm stand according to claim 10, wherein a coupling hole is formed in the horizontal bracket such that a rotating and tilting unit is coupled to the horizontal bracket through the coupling hole, the rotating and tilting unit rotating or tilting the display unit leftwards, rightwards, upwards or downwards to adjust a view angle thereof.

12. The arm stand according to claim 1, wherein a left and right turning unit, in place of the base, is further coupled to the mounting bracket, the left and right turning unit comprising: a second mounting bracket fastened to a horizontal base; and a second rotary link unit coupled to an upper end of the second mounting bracket so as to be rotatable leftwards and rightwards, the second rotary link unit comprising a main rotary link, an auxiliary rotary link and a tension spring provided between the mounting bracket and the second mounting bracket so as to be rotatable.

\* \* \* \* \*